US011861633B2

(12) United States Patent
Janakiraman et al.

(10) Patent No.: US 11,861,633 B2
(45) Date of Patent: *Jan. 2, 2024

(54) MACHINE LEARNING FOR IMPROVING MINED DATA QUALITY USING INTEGRATED DATA SOURCES

(71) Applicant: INTUIT INC., Mountain View, CA (US)

(72) Inventors: Vijay Manikandan Janakiraman, Mountain View, CA (US); Kevin Michael Furbish, Mountain View, CA (US); Nirmala Ranganathan, Mountain View, CA (US); Kymm K. Kause, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,092

(22) Filed: Mar. 7, 2023

(65) Prior Publication Data

US 2023/0222524 A1 Jul. 13, 2023

Related U.S. Application Data

(63) Continuation of application No. 16/879,713, filed on May 20, 2020, now Pat. No. 11,625,735.

(51) Int. Cl.
*G06Q 30/02* (2023.01)
*G06Q 30/0201* (2023.01)
(Continued)

(52) U.S. Cl.
CPC ....... *G06Q 30/0201* (2013.01); *G06F 16/215* (2019.01); *G06F 18/24* (2023.01);
(Continued)

(58) Field of Classification Search
CPC .......... G06Q 30/0239; G06Q 30/0204; G06Q 30/0201; G06F 16/215; G06K 9/6267; G06N 20/10
See application file for complete search history.

(56) References Cited

U.S. PATENT DOCUMENTS

2007/0198321 A1* 8/2007 Lakshminarayan ........................ G06Q 30/0201 705/7.29
2011/0119208 A1* 5/2011 Kirshenbaum .......... G06N 5/02 706/54
(Continued)

FOREIGN PATENT DOCUMENTS

WO WO 2007/098249 8/2007

OTHER PUBLICATIONS

University of Chicago, Too Many Metrics Jun. 2020 (Year: 2020).*
(Continued)

*Primary Examiner* — Breffni Baggot
(74) *Attorney, Agent, or Firm* — DLA PIPER LLP (US)

(57) ABSTRACT

A processor may receive user interaction data of a user for a plurality of electronically-presented offers. The processor may generate a plurality of labels, the generating comprising generating a label for each respective offer according to a comparison of the quality of the user interactions of the respective offer to the frequency of the user interactions of the respective offer. Each label may be a positive label or a negative label. The processor may determine whether the generating produced both positive and negative labels. The processor may select one of a plurality of available ML models, wherein a two-class ML model is chosen in response to determining that the generating produced both positive and negative labels and a one-class ML model is chosen in response to determining that the generating did not produce both positive and negative labels. The selected ML
(Continued)

model may be trained and/or may be used to process user profile data and provide recommendations.

20 Claims, 5 Drawing Sheets

(51) Int. Cl.
*G06F 16/215* (2019.01)
*G06N 20/10* (2019.01)
*G06Q 30/0207* (2023.01)
*G06F 18/24* (2023.01)
*G06Q 30/0601* (2023.01)

(52) U.S. Cl.
CPC ......... *G06N 20/10* (2019.01); *G06Q 30/0239* (2013.01); *G06Q 30/0631* (2013.01)

(56) References Cited

U.S. PATENT DOCUMENTS

| | | | |
|---|---|---|---|
| 2011/0218955 A1* | 9/2011 | Tang | G06N 5/02 709/224 |
| 2014/0247978 A1* | 9/2014 | Devin | G06F 18/217 382/159 |
| 2014/0372090 A1* | 12/2014 | Lee | G06N 20/00 703/2 |
| 2015/0269609 A1* | 9/2015 | Mehanian | G06Q 30/0254 705/14.45 |
| 2016/0203509 A1* | 7/2016 | Sharp, III | G06Q 30/0244 705/14.43 |
| 2016/0350802 A1* | 12/2016 | Mehanian | G06Q 30/0254 |
| 2017/0061481 A1* | 3/2017 | Wee | G06Q 30/0201 |
| 2017/0372351 A1* | 12/2017 | Sharp, III | G06Q 30/0202 |

OTHER PUBLICATIONS

University of Chicago, Patrick Billingsley, "Statistical Methods in Markov Chains", Annals of Mathematical Statistics vol. 32 No. 1 (Mar. 1961),pp. 12-40 (Year: 1961).*
University of Chicago Alan L. Montgomery, "Predicting Online Purchase Conversion Using Web Path" Marketing Science Conference, University of Alberta, Canada (2002))_ (Year: 2002).*
Forte (Mastering Predictive Analytics in R, by Forte) (Year: 2015).*
International Search Report dated Aug. 25, 2021 issued in PCT/US2021/032150.
Written Opinion dated Aug. 25, 2021 issued in PCT/US2021/032150.
Patrick Billingsley, "Statistical Methods in Markov Chains", Annals of Mathematical Statistics, vol. 32, No. 1. Mar. 1961, pp. 12-40.
Alan L. Montgomery, "Predicting Online Purchase Conversion Using Web Path" Marketing Science Conference, University of Alberta, Canada 2002, 2002.
Forte, "Mastering Predictive Analytics in R", 2015, 414 pgs.

* cited by examiner

MACHINE LEARNING FOR IMPROVING MINED DATA QUALITY USING INTEGRATED DATA SOURCES

CROSS-REFERENCE TO RELATED APPLICATION

This application is a continuation of U.S. application Ser. No. 16/879,713, filed May 20, 2020, entitled MACHINE LEARNING FOR IMPROVING MINED DATA QUALITY USING INTEGRATED DATA SOURCES. The content of which is incorporated herein by reference in its entirety.

BACKGROUND OF THE DISCLOSURE

Some software may recommend product offers to users (e.g., third party partner products). For example, for a financial software provider, some offers may include investment products, loans, or the like. Some known methods for identifying qualified leads (i.e., target customers) may use business logic. The use of business logic often identifies poor quality targets, for example having high missed detections (failing to identify customers who are good targets) and false alarms (identifying customers who are a poor fit). This results in low user engagement. The poor target quality is due to such technical deficiencies as an inability to efficiently and effectively integrate various user data, and an inability to efficiently and effectively generate offer outputs that are linked to the user data inputs in a specific, personalized fashion.

DETAILED DESCRIPTION OF SEVERAL EMBODIMENTS

Embodiments described herein use an automated machine learning pipeline to make recommendations using machine learning and user level data. The pipeline includes curating and integrating user data from various sources (e.g., across transactions, accounts, credit report, tax, and clickstream), processing the user data, automatically selecting an appropriate machine learning model based on the user data, training the selected machine learning model to automatically predict a product propensity likelihood that is used to define qualified customer targets, and using the trained model. The automatic selection of an appropriate one of a plurality of available machine learning models depending on properties of the available user data confers a technical advantage over traditional machine learning where a model is selected by a human engineer to suit a particular task. Automatic selection may allow the disclosed embodiments to self-tailor their own processing to suit user-specific, and therefore unpredictable, inputs in real time and thereby improve recommendation (or other output) quality.

Figure 1:
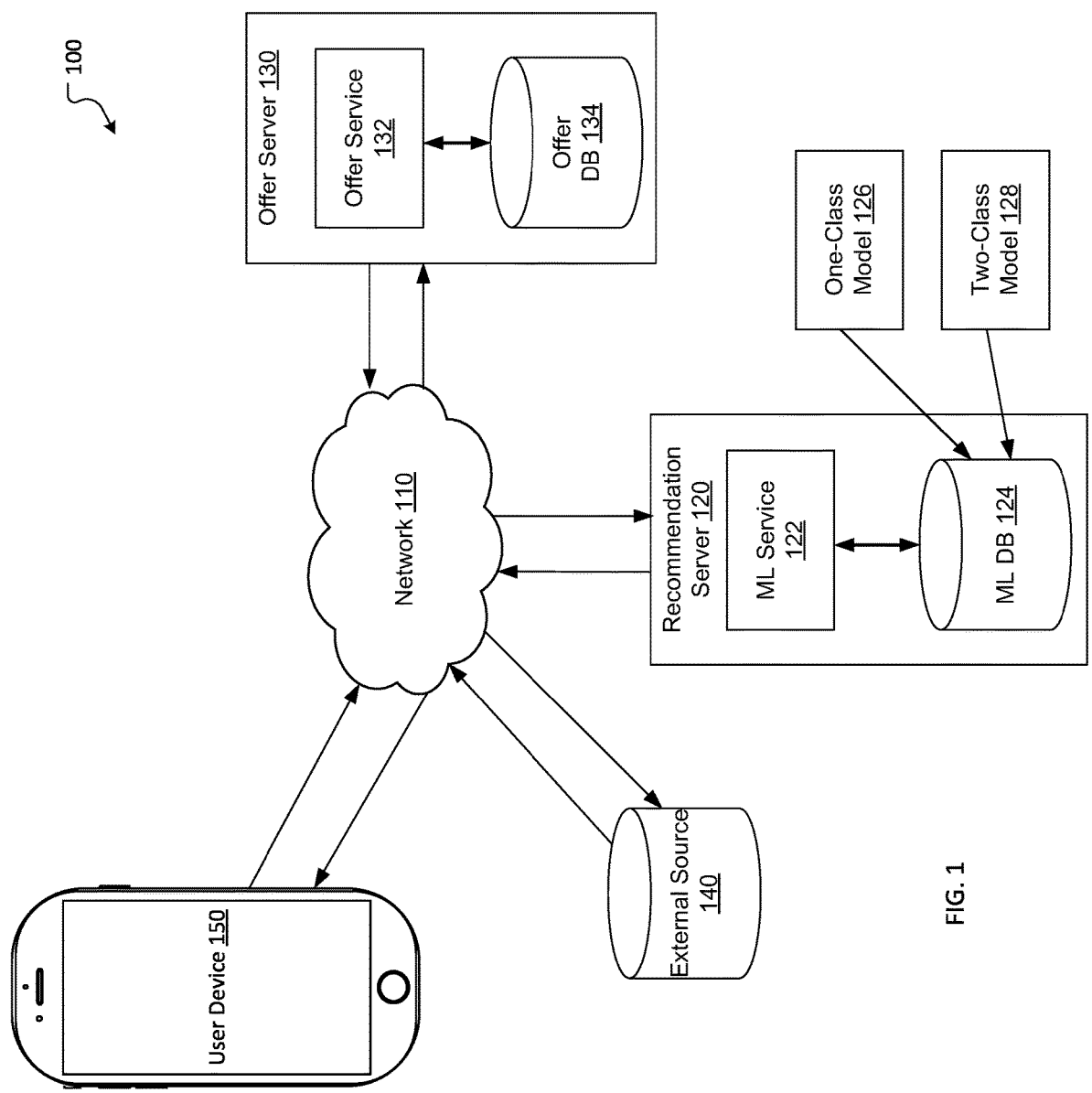
FIG. 1 shows an automated machine learning pipeline system according to an embodiment of the present disclosure.

FIG. 1 shows an automated machine learning pipeline system 100 according to an embodiment of the present disclosure. System 100 may include recommendation server 120, offer server 130, and/or user device 150. Network 110 may be the Internet and/or other public or private networks or combinations thereof. Recommendation server 120, offer server 130, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like.

Recommendation server 120 may be configured to gather data about a user (e.g., from offer server 130, user device 150, and/or one or more external sources 140 which may be available through network 110), process the data as described in detail below, select one of a plurality of machine learning (ML) models based on the processing as described in detail below, and train and/or apply the ML model. Recommendation server 120 may include ML service 122, which may be configured to collect and process the data, and ML database 124, which may be configured to store ML models, training data, and/or ML processing results. In the illustrated example, two ML models (one-class model 126 and two-class model 128) are maintained in ML database 124. Detailed examples of the data gathered, the processing performed, and the results generated are provided below.

Recommendation server 120 may communicate with offer server 130 to present offers to a user and/or evaluate offers previously presented. For example, offer server 130 may include offer service 132, which may be configured to select offers for presentation to the user (e.g., by sending to user device 150) based on data in offer database 134 and/or based on data from ML service 122. Detailed examples of the offers and offer selections are provided below.

User device 150 may be any device configured to present user interfaces and receive inputs thereto. For example, user device 150 may be a smartphone, personal computer, tablet, laptop computer, or other device. User device 150 may present offers from offer service 132 and/or reporting data from ML service 122 and/or other information. Detailed examples of the data exchanged between user device 150 and other system 100 elements are provided below.

Recommendation server 120, offer server 130, external source 140, and user device 150 are each depicted as single devices for ease of illustration, but those of ordinary skill in the art will appreciate that recommendation server 120, offer server 130, external source 140, and/or user device 150 may be embodied in different forms for different implementations. For example, recommendation server 120 and/or offer server 130 may include a plurality of servers. Alternatively, the operations performed by recommendation server 120 and/or offer server 130 may be performed on a single server. In another example, a plurality of user devices 150 may communicate with recommendation server 120 and/or offer server 130. A single user may have multiple user devices 150, and/or there may be multiple users each having their own user device(s) 150. Any number and/or type of external sources 140 may be available through network 110. An example computing device that may function as one or more of recommendation server 120, offer server 130, external source 140, and user device 150, or any portion thereof, is described in detail below with respect to FIG. 5.

Figure 2:
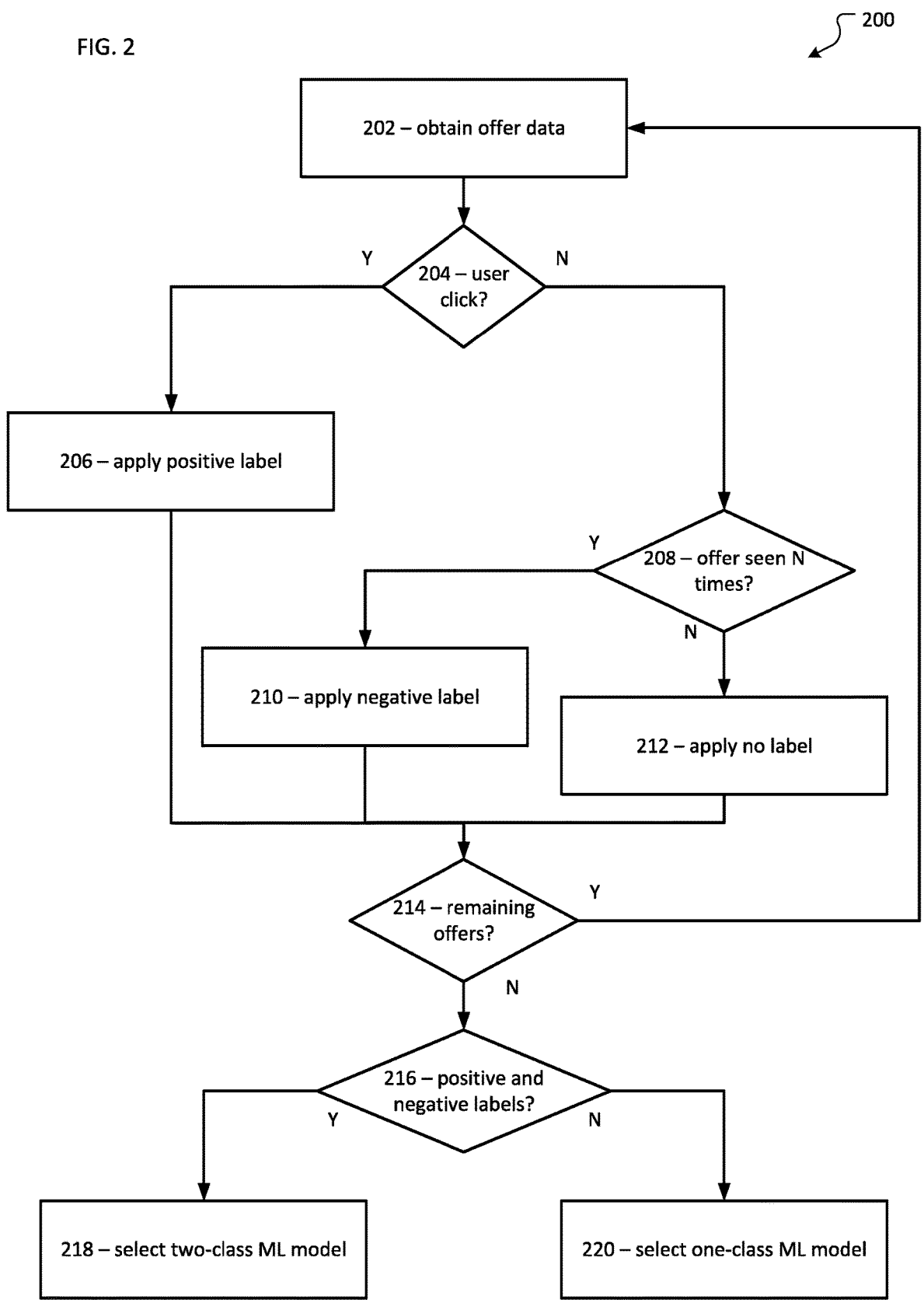
FIG. 2 shows machine learning model selection processing according to an embodiment of the present disclosure.

FIG. 2 shows machine learning model selection processing 200 according to an embodiment of the present disclosure. For example, recommendation server 120 may execute ML service 122 to perform process 200 and thereby select an available ML model that is configured for the data available. Once an ML model is selected, further processing for training (e.g., process 300) and/or recommendation (e.g., process 400) may be performed using the selected ML model, as described in detail below. In some embodiments, ML service 122 may perform such processing in combination with processing performed by and/or data received from offer server 130, external source 140, and/or user device 150.

At 202, ML service 122 may obtain offer data from offer server 130 and/or user device 150. The offer data may include user interaction data of a user for a plurality of electronically-presented offers, such as clickstream data. The user interaction data for each respective offer may indicate a frequency and a quality of user interactions with the offer. To show frequency, the offer data may identify one or more offers that were presented to the user and a number of times each offer was presented. Quality, in this case, may be an indication of whether the user interacted with the presented offers (e.g., by clicking on them) or not. For example, data from offer server 130 may indicate that offer server 130 sent an offer for a particular investment opportunity ("offer A") to user device 150 a number of times ("X"), a different offer for a particular credit card ("offer B") to user device 150 a number of times ("Y"), and another offer for a particular loan ("offer C") to user device 150 a number of times ("Z"). In another example, data from user device 150 may indicate that one or more of these offers was actually displayed in a user interface of user device 150 a given number of times. In some cases, some of the offer data may come from offer server 130, and some of the offer data may come from user device 150.

ML service 122 may employ string match rule-based logic to automatically infer, from the offer data received at 202, whether a user actively uses an offered product. This logic generates a positive label if the user is inferred to use the product and a negative label if the user is inferred to be uninterested in the product. The generating may comprise generating a label for each respective offer according to a comparison of the quality of the user interactions of the respective offer to the frequency of the user interactions of the respective offer.

For example, positive labels may be generated as follows. At 204, ML service 122 may determine, from the offer data received at 202, whether the user interacted with one of the offers. This may include determining whether the user clicked on the offer as indicated in the clickstream data. At 206, if a user clicked on the offer, ML service 122 may apply a positive label to the offer. For example, assume the user clicked on an advertisement for offer A presented on user device 150. ML service 122 will apply a positive label to offer A.

For offers not receiving a positive label, negative labels may be generated using historical clickstream data as follows. At 208, ML service 122 may determine, from the offer data received at 202, how many times the offer was presented. For example, ML service 122 may determine whether the offer was presented a predetermined number of times "N." At 210, if the offer was presented at least N times without a user interaction, ML service 122 may apply a negative label to the offer. On the other hand, at 212, if the offer was presented fewer than N times without a user interaction, ML service 122 may not apply a label to the offer at all. The value of N may be selected to give a desired sensitivity. For example, if N is set to 3, only three presentations without a click are required for a negative label. If N is set to 20, twenty presentations without a click are required for a negative label, making this N value less sensitive than N=3.

At 214, if there are remaining offers from the offer data that have not been evaluated for labeling, ML service 122 may repeat processing at 202-212 for these remaining offers.

ML service 122 may select one of a plurality of available ML models, wherein a two-class ML model (e.g., an XGBoost classifier) is chosen in response to determining that the generating produced both positive and negative labels and a one-class ML model (e.g., a support vector machine) is chosen in response to determining that the generating did not produce both positive and negative labels. For example, at 216, ML service 122 may determine whether the results of processing at 202-214 generated both positive and negative labels. If so, at 218, ML service 122 may select a two-class model. If only one type of label (i.e., positive or negative) was generated, at 220, ML service 122 may select a one-class model. The selection may be used for training processing 300 and/or recommendation processing 400 as described in detail below.

Figure 3:
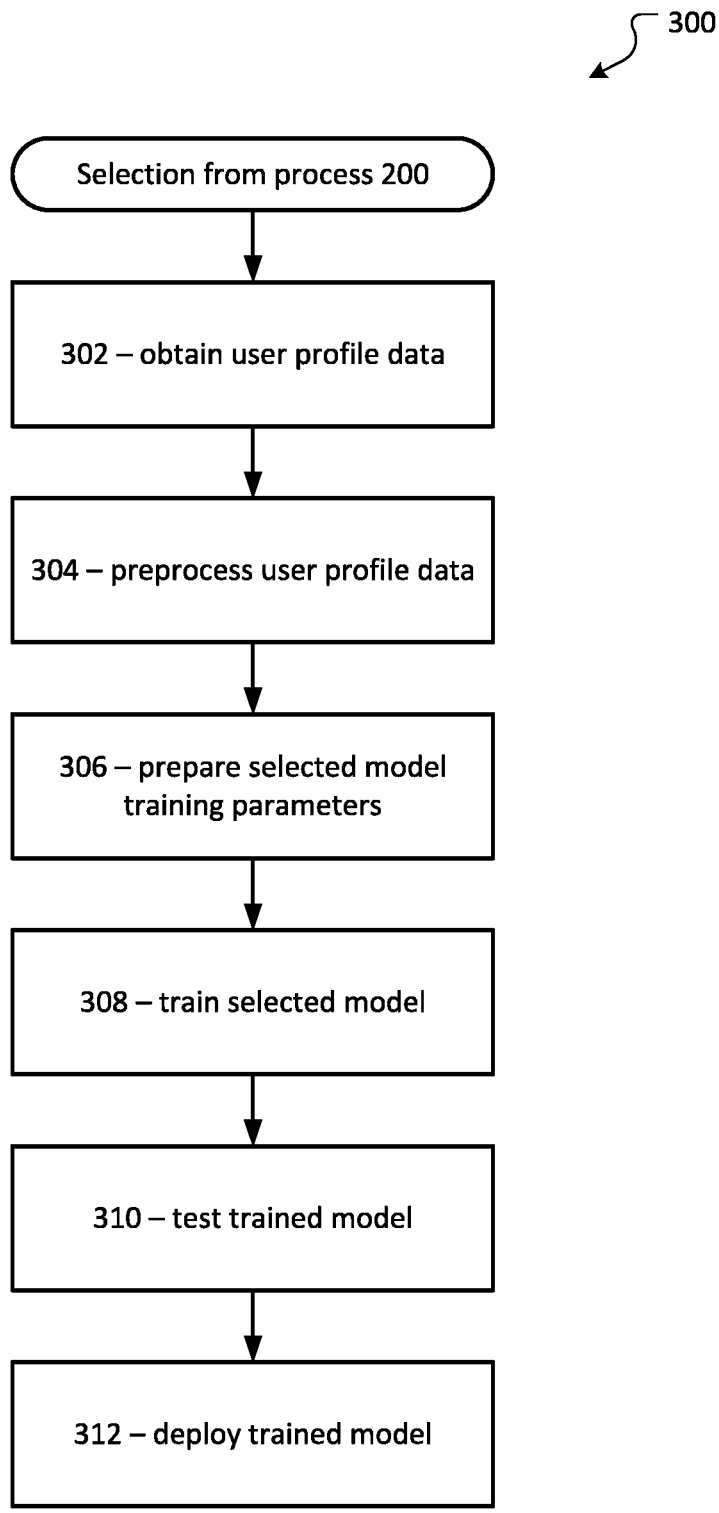
FIG. 3 shows machine learning training processing according to an embodiment of the present disclosure.

FIG. 3 shows machine learning training processing 300 according to an embodiment of the present disclosure. To perform training processing 300, ML service 122 can train the ML model that was selected by selection processing 200 described above.

At 302, ML service 122 may obtain user profile data. User profile data may describe user attributes, behaviors, and/or preferences. For example, user profile data may include user transaction data, user tax profile data, and/or user credit profile data. User profile data may be obtained from offer server 130, external source 140, user device 150, or a combination thereof. In some embodiments, user profile data may be generated according to the teachings of U.S. patent application Ser. Nos. 16/002,383; 16/177,469; and/or 16/429,119; the entirety of each of which is incorporated by reference herein.

In some embodiments, ML service 122 may derive at least one financial attribute from raw user data obtained at 302 to further incorporate into the user data. The deriving may include automatically calculating income, expenses, income volatility, expense volatility, investable cash, and/or credit score. For example, derived data may include one or more of the following:

Investment indicator: a positive indicator added if an investment product is found in the transaction data based on a string match on transaction description.

Total investable cash (example formula: checking account balance+savings account balance−monthly expense).

Number of months emergency fund covers at the current cost of living rate (example formula: [checking account balance+savings account balance]/monthly cost of living).

Transaction dates: for a given product, extract the first and latest dates when a user deposited money in the investment product account, with a positive indicator added if the user has indicated this relates to a particular goal in the user profile data.

Positive labels: a keyword search for a given offeror may be performed in transaction description/category fields/linked accounts. If there is a hit, and the user invested money during the given date range, a positive indicator may be added.

At 304, ML system 122 may preprocess the user profile data. For example, this may include automatically filling in missing values using median imputation, scaling and normalizing data using z-score normalization, removing duplicates, and removing outliers. Variables such as income, expenses, and similar aggregates may be transformed using a logarithmic transformation to derive attributes that are normally distributed.

At 306, ML system 122 may prepare training parameters for the selected ML model to be trained. For example, this may include splitting data into train, validation, and test data in predefined appropriate proportions and/or hyper-parameter tuning by defining a grid of a predetermined hyper-parameter range.

At 308, ML system 122 may train the selected ML model. Whether the selected ML model is a two-class ML model (e.g., an XGBoost classifier) or a one-class ML model (e.g., a support vector machine), training may proceed by inputting the training data split from the user profile data at 306 into the model, performing training according to the procedures specified by the model itself, and arriving at a preliminarily trained model as a result of the training.

Note that while specific models are given above for the two-class ML model and one-class ML model, these are not exclusive. For example, an XGBoost classification model may be chosen because it performs well on mixed continuous and categorical data, with limited numbers of labels, and with missing values. However, other ML classification models can be used in its place, and the ML system 122 will still work.

At 310, ML system 122 may test the preliminarily trained model from 308. For example, ML system 122 may run a random cross validation search using 5-fold cross validation and obtain the best performing model automatically. As a non-exclusive example for the two-class ML model, a trained model may be tuned to have an outlier fraction of 50% with a radial basis function kernel gamma value of 0.01. As a non-exclusive example for the one-class ML model, a precision-recall curve may be calculated and a prediction threshold may be selected that achieves maximum precision while achieving a minimum recall of 25%.

At 312, ML system 122 may deploy the trained ML model. In some embodiments, ML system 122 may perform retraining on the ML model based on the outcome of testing at 310 (e.g., using the same training data as derived above or different training data). The final ML model may be stored in ML database 124 for later predictive use (e.g., as described below with respect to FIG. 4).

Figure 4:
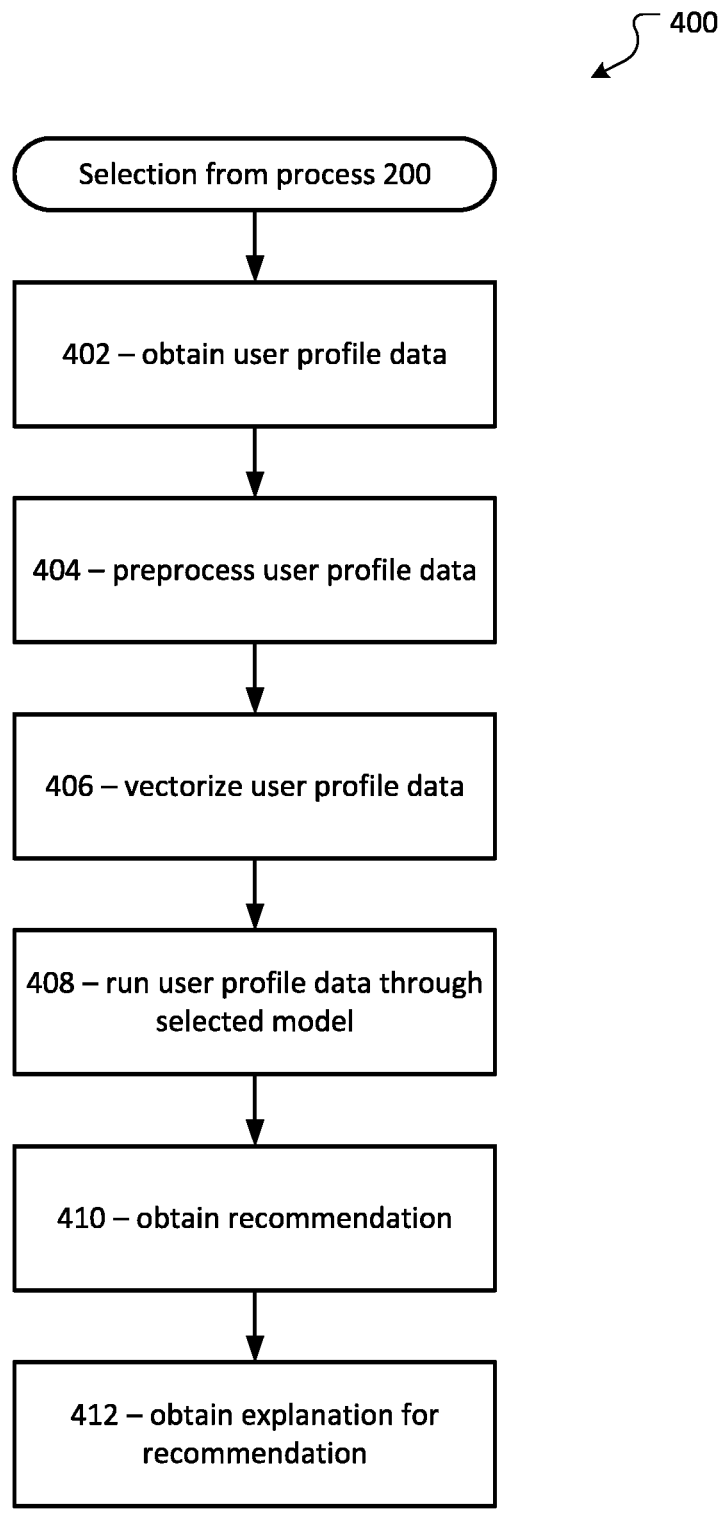
FIG. 4 shows recommendation processing according to an embodiment of the present disclosure.

FIG. 4 shows recommendation processing 400 according to an embodiment of the present disclosure. To perform recommendation processing 400, ML service 122 can use the trained ML model (e.g., available in ML database 124 after training processing 300) that was selected by selection processing 200 described above.

At 402, ML service 122 may obtain user profile data. User profile data may describe user attributes, behaviors, and/or preferences. For example, user profile data may include user transaction data, user tax profile data, and/or user credit profile data. User profile data may be obtained from offer server 130, external source 140, user device 150, or a combination thereof. In some embodiments, user profile data may be generated according to the teachings of U.S. patent application Ser. Nos. 16/002,383; 16/177,469; and/or 16/429,119; the entirety of each of which is incorporated by reference herein.

In some embodiments, ML service 122 may derive at least one financial attribute from raw user data obtained at 302 to further incorporate into the user data. The deriving may include automatically calculating income, expenses, income volatility, expense volatility, investable cash, and/or credit score. For example, derived data may include one or more of the following.

Investment indicator: a positive indicator added if an investment product is found in the transaction data based on a string match on transaction description.

Total investable cash (example formula: checking account balance+savings account balance−monthly expense).

Number of months emergency fund covers at the current cost of living rate (example formula: [checking account balance+savings account balance]/monthly cost of living).

Transaction dates: for a given product, extract the first and latest dates when a user deposited money in the investment product account, with a positive indicator added if the user has indicated this relates to a particular goal in the user profile data.

Positive labels: a keyword search for a given offeror may be performed in transaction description/category fields/linked accounts. If there is a hit, and the user invested money during the given date range, a positive indicator may be added.

At 404, ML service 122 may preprocess the user profile data in some embodiments. For example, this may include automatically filling in missing values using median imputation, scaling and normalizing data using z-score normalization, removing duplicates, and removing outliers.

At 406, ML service 122 may vectorize the user profile data in some embodiments. For example, variables such as income, expenses, and similar aggregates may be transformed using a logarithmic transformation to derive attributes that are normally distributed. This may correct for wide variability across groups of users in these attributes. For example, income may be widely distributed (e.g., some users may earn $10,000/yr. and others may earn $1,000,000/yr.), but percentage of income may be the more important factor for a user selecting a given offer, so income may be normalized.

At 408, ML service 122 may input the user profile data (preprocessed and/or vectorized in some embodiments) into the selected ML model for processing. At 410, ML service 122 may obtain the outcome of the ML model processing based on the input user profile data. The outcome may include at least one offer recommendation. In some embodiments, ML service 122 may rank the recommendations when there are plural recommendations. For example, ML service 122 may gather the prediction likelihood scores for all offers as generated by the ML model processing and rank the offers based on the likelihood scores. This results in a ranked list of offers for the user that may be used for targeting purposes. ML service 122 may cause the recommended offer(s) to be presented to the user associated with the user profile data, for example by sending one or more of the offer(s) to user device 150 or by notifying offer server 130 that one or more of the recommended offer(s) are to be sent from offer server 130 to user device 150.

At 412, ML service 122 may generate an explanation for the recommendation from 410. For example, the explanation may be generated automatically using the open-source SHAP processing method or a similar method. The explanation may be based on feature importance for a given combination of user and offer. ML service 122 may send the explanation to user device 150 for display to the user, to offer server 130 for display to an administrator responsible for offers, stored in ML database 124, etc.

Figure 5:
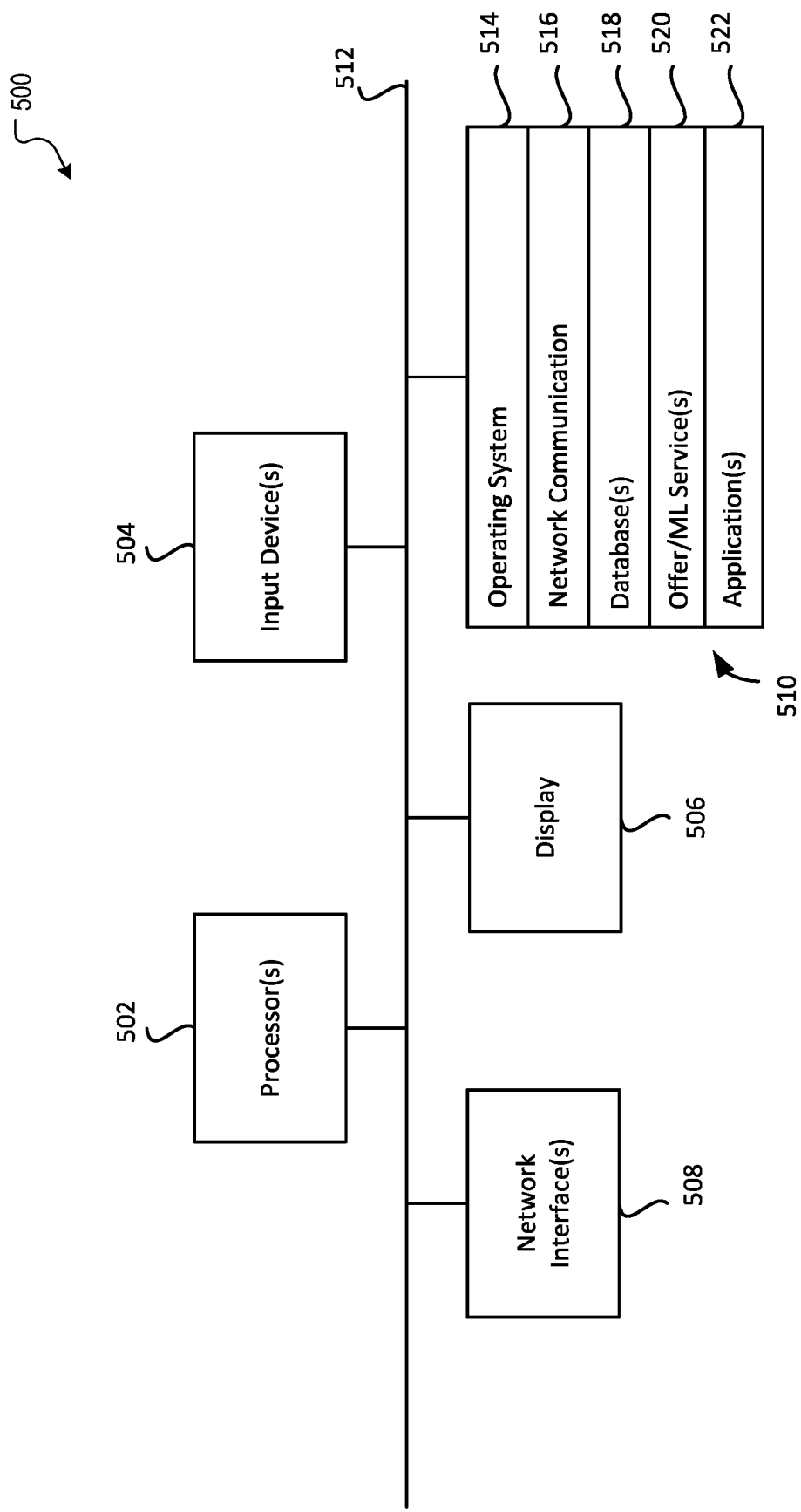
FIG. 5 shows a computing device according to an embodiment of the present disclosure.

FIG. 5 shows a computing device 500 according to an embodiment of the present disclosure. For example, computing device 500 may function as recommendation server 120, offer server 130, external source 140, user device 150, any combinations thereof, or any portions thereof. Computing device 500 may be implemented on any electronic device that runs software applications derived from compiled instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. In some embodiments, some or all devices shown as coupled by bus 512 may not be coupled to one another by a physical bus, but by a network connection, for example. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

Database 518 may function as external source 140, ML database 124 and/or offer database 134, and may store training data, trained ML models, user profile data, clickstream data, offer data, and/or other data. Offer and/or ML instructions 520 may include instructions that enable computing device 500 to perform automated machine learning pipeline system 100 functionality as described herein. Application(s) 522 may be an application that uses or implements the processes described herein and/or other processes, for example applications used to provide the functionality of recommendation server 120, offer server 130, external source 140, and/or user device 150. The processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Various embodiments may provide a data mining model that can make personalized partner offer product recommendations to users. By personalizing the recommendations, users engage with products more, gain trust in the recommendations, and convert to signing up following the recommendations. In addition to the technical benefits described above, the systems and methods described herein can provide increased user engagement and trust, increased conversion resulting in more money through offering partners, and better partner relationships.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An automated machine learning (ML) selection method comprising:
    receiving, at a processor, clickstream user interaction data of a user for a plurality of electronically-presented offers, the user interaction data for each respective offer indicating a frequency and a quality of user interactions with the offer;
    generating, by the processor, a plurality of labels, the generating comprising generating a label for each respective offer according to a comparison of the quality of the user interactions of the respective offer to the frequency of the user interactions of the respective offer, where the label is a positive label or a negative label,
        the comparison of the quality of the user interactions of the respective offer to the frequency of the user interactions of the respective offer comprising a determination that the user has been presented the respective offer a predetermined number of times but has not clicked on the offer,
        the generated label being a negative label responsive to the determination that the user has been presented the respective offer the predetermined number of times but has not clicked on the offer;
    determining, by the processor, whether the generating produced both positive and negative labels; and
    selecting, by the processor, one of a plurality of available ML models for processing user profile data of the user, a two-class ML model being chosen in response to determining that the generating produced both positive and negative labels and a one-class ML model being chosen in response to determining that the generating did not produce both positive and negative labels.

2. The method of claim 1, further comprising:
    training, by the processor, the selected ML model using the user profile data.

3. The method of claim 1, further comprising:
    selecting, by the processor, a recommended offer based on processing the user profile data with the selected ML model; and
    presenting, by the processor, the recommended offer to the user by a user interface.

4. The method of claim 1, wherein the two-class ML model comprises an XGBoost classifier that has been trained to achieve maximum precision while achieving a minimum recall of 25%.

5. The method of claim 1, wherein the one-class ML model comprises a support vector machine that has been trained to have an outlier fraction of 50% with a radial basis function kernel gamma value of 0.01.

6. The method of claim 1, further comprising obtaining, by the processor, the user profile data, the obtaining comprising:
    receiving raw user data comprising at least one of user transaction data, user tax profile data, and user credit profile data; and
    deriving at least one financial attribute from the raw user data, the deriving comprising automatically calculating at least one of income, expenses, income volatility, expense volatility, investable cash, and credit score.

7. The method of claim 1, further comprising preprocessing, by the processor, the user profile data prior to the processing, the preprocessing comprising at least one of filling in a missing value, scaling and normalizing a value, removing a duplicate value, and removing an outlier value.

8. The method of claim 1, further comprising:
    selecting, by the processor, a recommended offer based on processing the user profile data with the selected ML model;
    generating, by the processor, an explanation for the selection of the recommended offer; and
    reporting, by the processor, the explanation.

9. The method of claim 1, further comprising:
    processing, by the processor, the user profile data with the selected ML model to generate at least one prediction;
    selecting, by the processor, a recommended offer corresponding to the at least one prediction;
    the at least one prediction comprising multiple predictions;
    the processing comprising ranking the multiple predictions; and
    the selecting comprising selecting a highly ranked one of the multiple predictions.

10. An automated machine learning (ML) selection method comprising:

receiving, at a processor, clickstream user interaction data of a user for a plurality of electronically-presented offers, the user interaction data for each respective offer indicating a frequency and a quality of user interactions with the offer;

generating, by the processor, a plurality of labels, the generating comprising generating a label for each respective offer according to a comparison of the quality of the user interactions of the respective offer to the frequency of the user interactions of the respective offer, where the label is a positive label or a negative label, the comparison of the quality of the user interactions of the respective offer to the frequency of the user interactions of the respective offer comprising a determination that the user has been presented the respective offer a predetermined number of times but has not clicked on the offer, the generated label being a negative label responsive to the determination that the user has been presented the respective offer the predetermined number of times but has not clicked on the offer;

determining, by the processor, whether the generating produced both positive and negative labels; and selecting, by the processor, one of a plurality of available ML models, wherein a two-class ML model is chosen in response to determining that the generating produced both positive and negative labels and a one-class ML model is chosen in response to determining that the generating did not produce both positive and negative labels.

11. The method of claim 10, further comprising:
training, by the processor, the selected ML model using user profile data.

12. The method of claim 10, further comprising:
selecting, by the processor, a recommended offer based on processing user profile data of the user with the selected ML model; and
presenting, by the processor, the recommended offer to the user by a user interface.

13. The method of claim 10, wherein the two-class ML model comprises an XGBoost classifier.

14. The method of claim 13, further comprising:
training, by the processor, the selected ML model using user profile data of the user, the training comprising:
selecting model data;
initializing the model with a base score of a class imbalance ratio;
tuning at least one hyper-parameter;
training the model using at least a portion of the training data;
calculating a precision-recall curve; and
selecting a prediction threshold that achieves maximum precision while achieving a minimum recall of 25%.

15. The method of claim 10, wherein the one-class ML model comprises a support vector machine.

16. The method of claim 15, further comprising:
training, by the processor, the selected ML model using user profile data of the user, the training comprising:
selecting model data; and
training the model using at least a portion of the training data using an outlier fraction of 50% with a radial basis function kernel gamma value of 0.01.

17. A machine learning (ML) system comprising:
at least one memory configured to store a plurality of available ML models and user profile data; and
a processor in communication with the at least one memory and configured to:
receive clickstream user interaction data of a user for a plurality of electronically-presented offers, the user interaction data for each respective offer indicating a frequency and a quality of user interactions with the offer;
generate a plurality of labels, the generating comprising generating a label for each respective offer according to a comparison of the quality of the user interactions of the respective offer to the frequency of the user interactions of the respective offer, where the label is a positive label or a negative label,
the comparison of the quality of the user interactions of the respective offer to the frequency of the user interactions of the respective offer comprising a determination that the user has been presented the respective offer a predetermined number of times but has not clicked on the offer,
the generated label being a negative label responsive to the determination that the user has been presented the respective offer the predetermined number of times but has not clicked on the offer, the generated label is a negative label;
determine whether the generating produced both positive and negative labels; and
select one of the available ML models, wherein a two-class ML model is chosen in response to determining that the generating produced both positive and negative labels and a one-class ML model is chosen in response to determining that the generating did not produce both positive and negative labels.

18. The system of claim 17, wherein the two-class ML model comprises an XGBoost classifier, which is trained by:
selecting model data;
initializing the model with a base score of a class imbalance ratio;
tuning at least one hyper-parameter;
training the model using at least a portion of the training data;
calculating a precision-recall curve; and
selecting a prediction threshold that achieves maximum precision while achieving a minimum recall of 25%.

19. The system of claim 17, wherein the one-class ML model comprises a support vector machine, which is trained by:
selecting model data; and
training the model using at least a portion of the training data using an outlier fraction of 50% with a radial basis function kernel gamma value of 0.01.

20. The system of claim 17, wherein the processor is further configured to obtain the user profile data and store the user profile data in the at least one memory, the obtaining comprising:
receiving raw user data comprising at least one of user transaction data, user tax profile data, and user credit profile data; and
deriving at least one financial attribute from the raw user data, the deriving comprising automatically calculating at least one of income, expenses, income volatility, expense volatility, investable cash, and credit score.

* * * * *